US009003807B2

(12) United States Patent
Chehab et al.

(10) Patent No.: US 9,003,807 B2
(45) Date of Patent: Apr. 14, 2015

(54) GAS TURBINE ENGINE WITH STRUCTURE FOR DIRECTING COMPRESSED AIR ON A BLADE RING

(75) Inventors: Abdullatif M. Chehab, Chuluota, FL (US); David A. Little, Chuluota, FL (US)

(73) Assignee: Siemens Aktiengesellschaft, München (DE)

(*) Notice: Subject to any disclaimer, the term of this patent is extended or adjusted under 35 U.S.C. 154(b) by 696 days.

(21) Appl. No.: 13/291,147

(22) Filed: Nov. 8, 2011

(65) Prior Publication Data

US 2013/0111919 A1 May 9, 2013

(51) Int. Cl.

| | |
|---|---|
| ***F02C 6/08*** | (2006.01) |
| ***F02C 6/04*** | (2006.01) |
| ***F02C 7/12*** | (2006.01) |
| ***F01D 11/24*** | (2006.01) |
| ***F01D 25/10*** | (2006.01) |

(52) U.S. Cl.

CPC ................ *F01D 11/24* (2013.01); *F01D 25/10* (2013.01); *F05D 2260/201* (2013.01)

(58) Field of Classification Search

CPC .............. F02C 7/12; F02C 7/143; F02C 7/16; F02C 7/18; F02C 7/185; Y02T 50/676; F01D 11/24

USPC ............................ 60/782, 785, 795, 805, 806

See application file for complete search history.

(56) References Cited

U.S. PATENT DOCUMENTS

| | | | | |
|---|---|---|---|---|
| 4,019,320 | A | 4/1977 | Redinger, Jr. et al. | |
| 4,928,240 | A | 5/1990 | Davison et al. | |
| 5,127,793 | A | 7/1992 | Walker et al. | |
| 5,351,732 | A | 10/1994 | Mills et al. | |
| 5,779,436 | A | 7/1998 | Glezer et al. | |
| 6,065,282 | A | 5/2000 | Fukue et al. | |
| 6,098,395 | A * | 8/2000 | North | 60/782 |
| 6,120,249 | A | 9/2000 | Hultgren et al. | |
| 6,152,685 | A | 11/2000 | Hagi | |
| 7,007,488 | B2 * | 3/2006 | Orlando et al. | 60/782 |
| 7,708,518 | B2 | 5/2010 | Chehab | |
| 7,823,389 | B2 * | 11/2010 | Seitzer et al. | 60/782 |
| 8,181,443 | B2 * | 5/2012 | Rago | 60/226.1 |
| 2004/0088995 | A1 | 5/2004 | Reissig | |
| 2005/0109039 | A1 | 5/2005 | Chehab et al. | |
| 2005/0126181 | A1 * | 6/2005 | Wilson et al. | 60/785 |
| 2006/0005546 | A1 * | 1/2006 | Orlando et al. | 60/782 |
| 2007/0276578 | A1 | 11/2007 | Herron et al. | |
| 2008/0112798 | A1 * | 5/2008 | Seitzer et al. | 415/144 |
| 2008/0236170 | A1 | 10/2008 | Weaver et al. | |
| 2010/0139288 | A1 * | 6/2010 | Rago | 60/785 |
| 2010/0281879 | A1 * | 11/2010 | Shapiro et al. | 60/782 |

* cited by examiner

*Primary Examiner* — Gerald L Sung

(57) ABSTRACT

The present invention comprises a gas turbine engine and a process for operating a gas turbine engine. A fluid structure receives compressed air from a compressor and extends toward a stationary blade ring in a turbine to discharge the compressed air directly against a surface of the blade ring such that the compressed air impinges on the blade ring surface. The compressed air then passes through at least one opening in the stationary blade ring and into cooling passages of a corresponding row of vanes.

18 Claims, 5 Drawing Sheets

GAS TURBINE ENGINE WITH STRUCTURE FOR DIRECTING COMPRESSED AIR ON A BLADE RING

FIELD OF THE INVENTION

This invention relates in general to a gas turbine engine and structure for directing compressed air directly on a blade ring.

BACKGROUND OF THE INVENTION

Controlling gas turbine engine blade tip clearance is desirable so as to maintain engine structural integrity and efficient performance. Turbine efficiency improves as the clearance or gap between turbine blade tips and a surrounding static structure is reduced. The static structure comprises a blade ring coupled to an engine casing and a ring segment coupled to the blade ring via isolation rings. The ring segment is exposed to hot working gases passing through the gas turbine. During engine startup, the turbine blades radially expand quickly due to a rapid increase in the temperature of the hot working gases impinging and centrifugal forces acting on the blades. Also during start-up, the blade ring expands radially outward away from the blade tips as the temperature of the blade ring increases. However, the temperature of the blade ring increases to its steady state temperature at a slower rate than that of the blades during engine start-up. The diameter of the blade ring and the length of the blades are designed so that during engine startup, the tips of the blades do not contact an inner surface of the static structure ring segment. However, during steady-state operation, the gap between the blade tips and the static structure ring segment increases due to the blade ring temperature increasing.

SUMMARY OF THE INVENTION

In accordance with a first aspect of the present invention, a gas turbine engine is provided comprising a compressor for generating compressed air. The compressed air may increase in temperature from ambient when the gas turbine engine begins operation to an elevated temperature. The gas turbine engine may further comprise a turbine comprising a plurality of rows of vanes; a plurality of rows of rotatable blades; at least one static structure comprising a blade ring surrounding a corresponding row of vanes and a corresponding row of blades; and fluid structure for receiving compressed air from the compressor and extending toward the one stationary blade ring for discharging the compressed air directly against a surface of the blade ring at least during an initial startup period of the gas turbine engine such that the compressed air impinges on the blade ring surface.

The temperature of the compressed air may quickly increase to the elevated temperature after the gas turbine engine begins operation such that it transfers energy in the form of heat to the stationary blade ring during ramp-up of the gas turbine engine from about 0% load to about 100% load, thereby causing the stationary blade ring to move radially away from the corresponding row of blades.

The fluid structure may comprise at least one impingement pipe located adjacent the blade ring surface. The at least one impingement pipe may comprise a plurality of openings positioned so as to discharge the compressed air toward the blade ring surface. The at least one impingement pipe may extend circumferentially. The at least one static structure may further comprise a ring segment coupled to the blade ring and positioned between the blade ring and the corresponding row of blades.

The vanes of the corresponding row of vanes may comprise cooling passages which communicate with at least one corresponding opening in the one blade ring such that the compressed air passes through the vane passages after impinging upon the blade ring surface. The gas turbine engine may still further comprise a plurality of static structures comprising blade rings, each static structure surrounding a corresponding row of vanes and a corresponding row of blades.

In accordance with a second aspect of the present invention, a gas turbine engine is provided comprising a compressor for generating compressed air, a turbine and fluid structure. The turbine may comprise a plurality of rows of vanes; a plurality of rows of rotatable blades; and at least one static structure comprising a blade ring surrounding a corresponding row of vanes and a corresponding row of blades. Each of the vanes of the corresponding row of vanes may comprise a cooling passage. The blade ring may include at least one opening for communicating with the cooling passages of the corresponding row of vanes.

The fluid structure may receive compressed air from the compressor and extend toward the stationary blade ring for discharging the compressed air directly against a surface of the blade ring such that the compressed air impinges on the blade ring surface and then passes through the at least one opening in the stationary blade ring and into the cooling passages of the corresponding row of vanes. The temperature of the compressed air may quickly increase to the elevated temperature after the gas turbine engine begins operation such that it transfers energy in the form of heat to the stationary ring during ramp up of the gas turbine engine, thereby causing the stationary ring to move radially away from the corresponding row of blades. The compressed air may further function to cool the stationary ring during steady state operation of the gas turbine engine.

The fluid structure may comprise at least one impingement pipe located adjacent the blade ring surface. The at least one impingement pipe may comprise a plurality of openings positioned so as to direct the compressed air toward the blade ring surface.

The gas turbine engine may still further comprise a plurality of static structures comprising blade rings, each static structure surrounding a corresponding row of vanes and a corresponding row of blades. The fluid structure may discharge the compressed air in a direction away from the at least one opening in the blade ring.

In accordance with a third aspect of the present invention, a process for operating a gas turbine engine is provided. The gas turbine engine may comprise a compressor for generating compressed air and a turbine. The turbine may comprise a plurality of rows of vanes; a plurality of rows of rotatable blades; and at least one static structure comprising a blade ring surrounding a corresponding row of vanes and a corresponding row of blades. The process comprises discharging compressed air directly against a surface of the blade ring at least during an initial startup period of the gas turbine engine such that the compressed air impinges on the blade ring surface so as to increase the temperature of the blade ring surface. The discharging step may comprise discharging the compressed air continuously during substantially the entire operation of the gas turbine engine.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
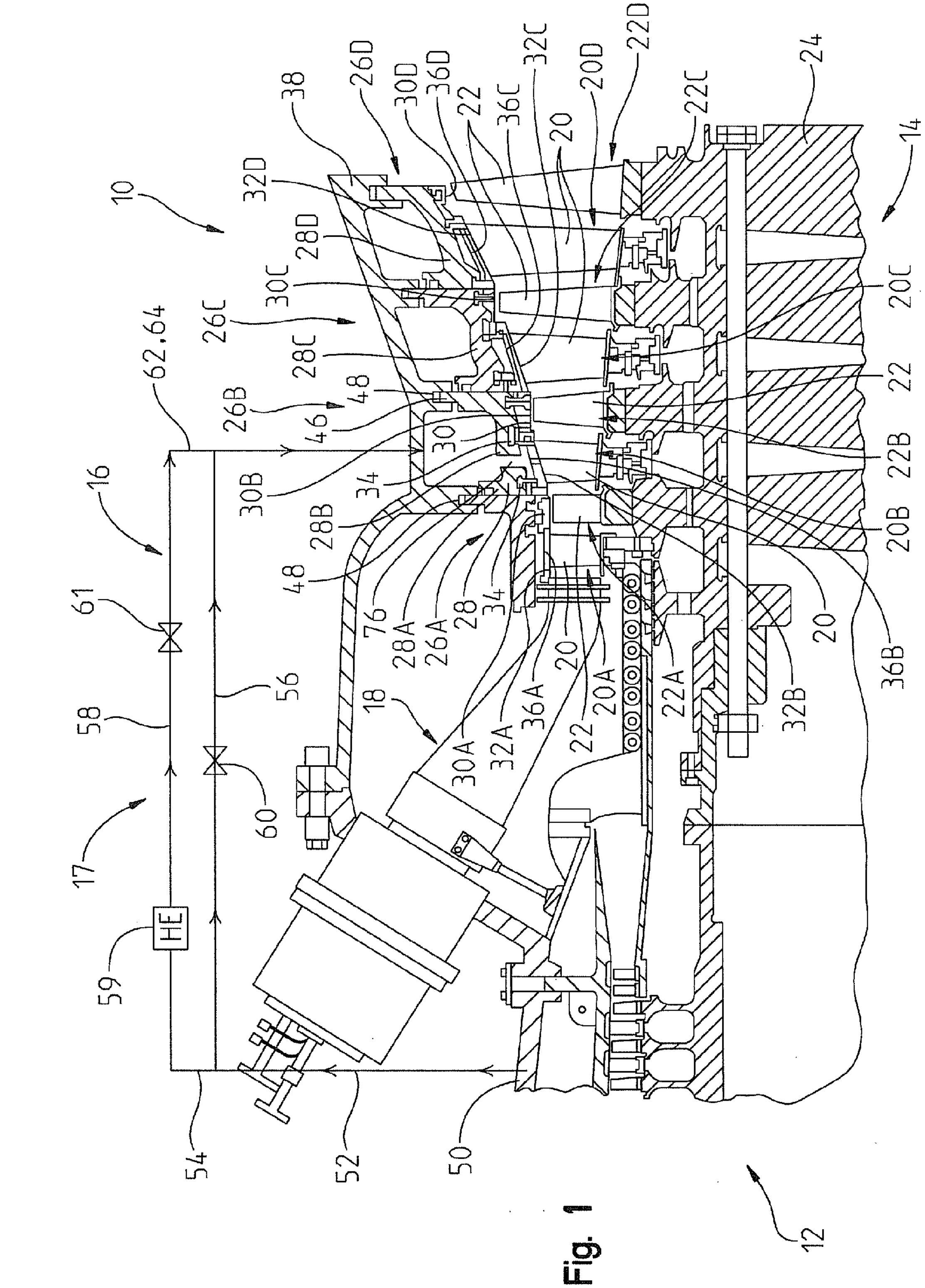
FIG. 1 is a partial cross-sectional of the gas turbine engine with a schematic illustration of the fluid structure according to one aspect of the present invention.
Figure 2:
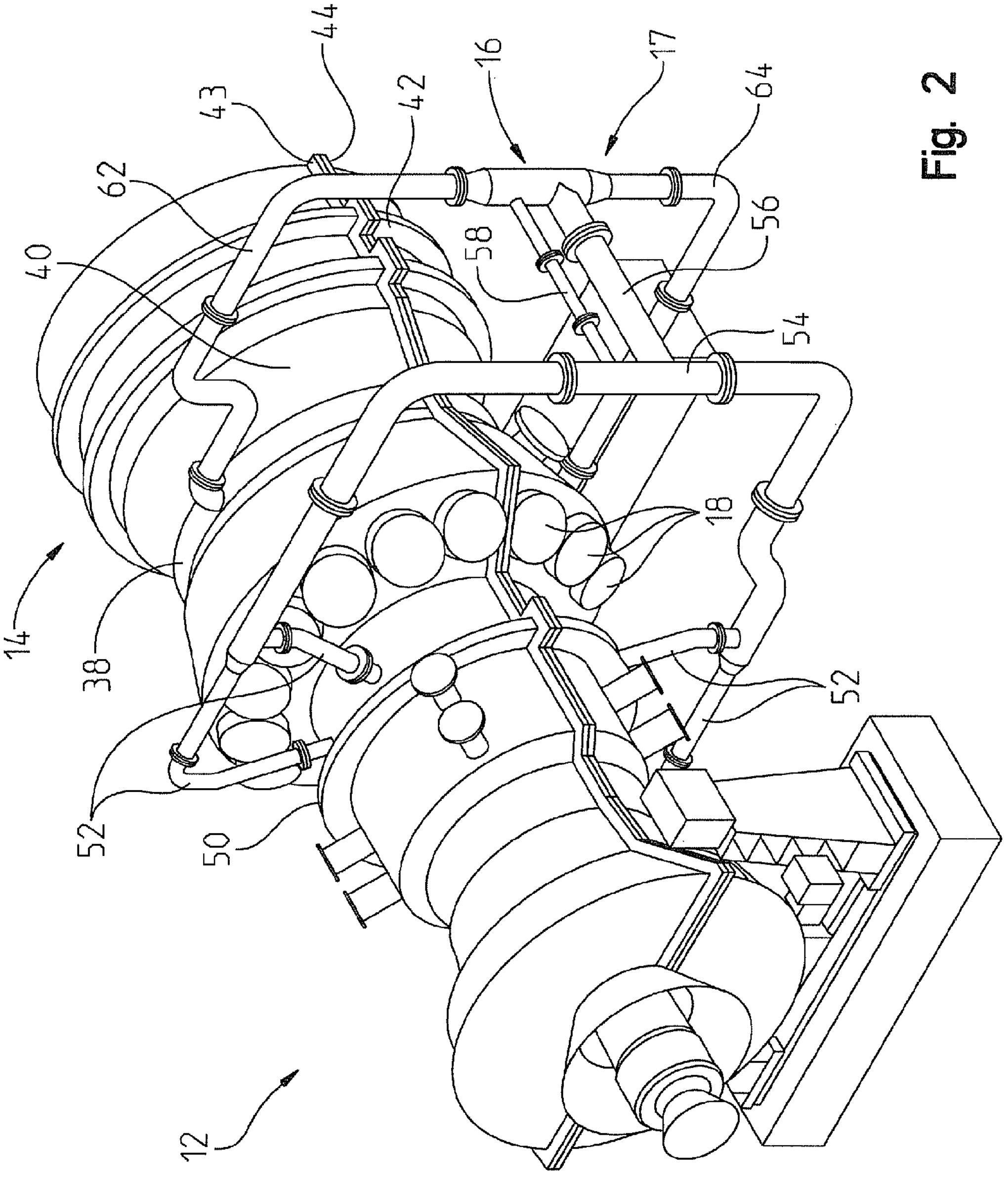
FIG. 2 is a perspective view of the gas turbine engine with the fluid structure according to another aspect of the present invention.

Reference is now made to FIGS. 1 and 2, which shows an industrial gas turbine engine assembly 10 according to the present invention. The gas turbine assembly 10 comprises, in the illustrated embodiment, a compressor 12 for generating compressed air, a turbine 14 for converting hot working gases into rotational energy and fluid structure 16 coupled to and extending between the compressor 12 and the turbine 14. The compressor 12 includes a compressor casing 50 while the turbine 14 is housed in a turbine casing 38. The two casings 50 and 38 may be integral. The turbine casing 38 of the illustrated embodiment is comprised of two semi-cylindrical halves 40, 42 that meet at a pair of horizontal flanges 43, 44 as shown in. FIG. 2. The pair of flanges 43, 44 may connect the top and bottom turbine casing halves together along a horizontal plane. A circular array of combustors 18 is arranged axially between the compressor 12 and the turbine 14. Compressed air generated from the compressor 12 is mixed with fuel and ignited in the combustors 18 to provide hot working gases to the turbine 14.

In the illustrated embodiment, the turbine 14 comprises a plurality of rows of vanes 20 and a plurality of rows of rotatable blades 22, see FIG. 1. The rows of rotatable blades 22 are arranged circumferentially around a turbine shaft 24. Each row of stationary turbine vanes 20 is located upstream of a respective row of rotatable blades 22 in an axial direction. In the illustrated embodiment, there are first, second, third and fourth rows 20A-20D of vanes 20 and first, second, third and fourth rows 22A-22D of blades 22.

Figure 3:
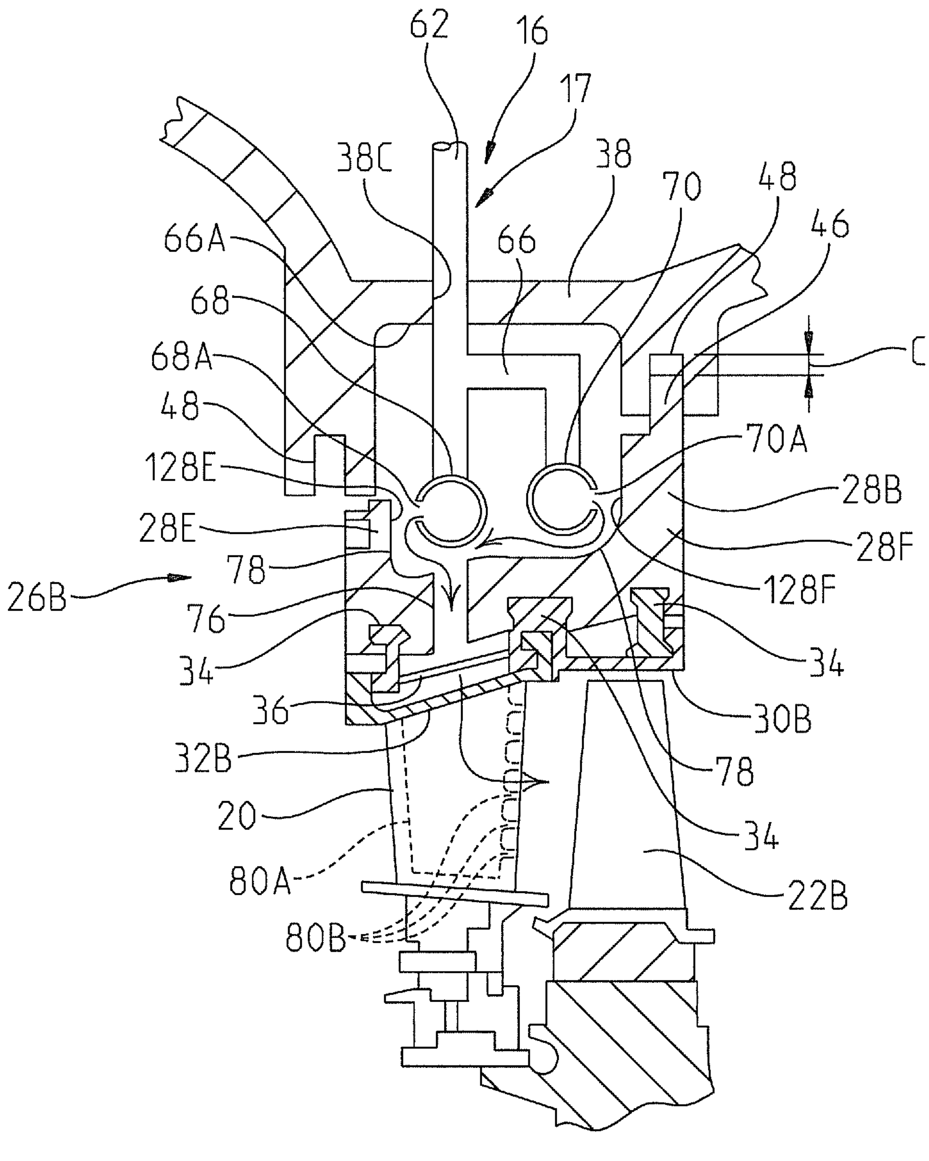
FIG. 3 is an enlarged cross-sectional view of a turbine blade ring, turbine blade, turbine vane and fluid structure according to another aspect of the present invention.

In the illustrated embodiment, first, second, third and fourth static structures 26A-26D comprising first, second, third and fourth blade rings 28A-28D are provided. The first blade ring 28A generally surrounds the first row 20A of vanes 20 and the first row 22A of blades 22, the second blade ring 28B generally surrounds the second row 20B of vanes 20 and the second row 22B of blades, the third blade ring 28C generally surrounds the third row 20C of vanes 20 and the third row 22C of blades 22, and the fourth blade ring 28D generally surrounds the fourth row 20D of vanes 20 and the fourth row 22D of blades 22. Each of the blade rings 28A-28D comprises first and second generally semi-circular halves which are bolted together at their horizontal joints at assembly to form a complete cohesive blade ring (only the first halves of the blade rings 28A-28D are illustrated in FIGS. 1 and 3).

The first static structure 26A further comprises a first ring segment 30A, the second static structure 26B further comprises a second ring segment 30B, the third static structure 26C further comprises a third ring segment 30C and the fourth static structure 26D further comprises a fourth ring segment 30D. The first, second, third and fourth ring segments 30A-30D are generally axially aligned with and radially spaced a small distance from the first, second, third and fourth rows 22A-22D of blades 22.

Each vane 20 of the first, second, third and fourth rows 20A-20D of vanes comprises a vane platform 32A-32D.

The first, second, third and fourth ring segments 30A-30D and the first, second, third and fourth vane platforms 32A-32D cooperate to form an axially and circumferentially-extending wall that prevents hot gases from reaching the blade rings 28A-28D. Isolation rings 34 are coupled to the blade rings 28A-28D, the ring segments 30A-30D and the vane platforms 32A-32D so as to couple the ring segments 30A-30D and vane platforms 32A-32D to the blade rings 28A-28D. The ring segments 30A-30D and vane platforms 32A-32D are radially spaced from the blade rings 28A-28D to reduce heat transfer from the ring segments 30A-30D and vane platforms 32A-32D to the blade rings 28A-28D.

An impingement plate 36A-36D may be coupled to corresponding isolation rings 34 and located between each of the first, second, third and fourth rows 20A-20D of vanes 20 and a corresponding blade ring 28B-28D.

The turbine casing 38 of the illustrated embodiment fully surrounds the blade rings 28A-28D, see FIG. 1. As noted above, the semi-circular halves of each blade ring 28A-28D are bolted to one another. Each assembled, generally circular blade ring 28A-28D may have tabs (not shown) extending outwardly at generally 0 and 180 degree locations, which tabs rest on mating tabs (not shown) provided on the turbine casing 38. Each blade ring 28A-28D also comprises a blade ring flange 46 extending circumferentially about and radially outwardly from a downstream end 28F of each blade ring 28A-D. The flange 46 on the second blade ring 28B is shown in FIG. 3. The inner surface of the turbine casing 38 includes a series of casing channels 48 that fix the axial position of the blade rings 28A-28D through the blade ring flanges 46. The casing channels 48 and blade ring flanges 46 accommodate radial expansion of the blade rings 28A-28D by providing a clearance C between an outer tip of the blade ring flange 46 and an inner surface of the casing channel 48, as shown in FIG. 3.

As schematically shown in FIG. 1 and shown in detail in FIG. 2, the fluid structure 16 extends between and is coupled to the compressor 12 and the turbine 14. The fluid structure 16 in the illustrated embodiment includes pipe structure 17 extending outwardly from the compressor casing 50 to allow compressed air from the compressor 12 to bypass the combustors 18 and flow inwardly into the turbine casing 38. Conduits, ducts or similar fluid transferring structure may be utilized as the pipe structure 17 according to the present invention. As illustrated in FIG. 2, the pipe structure 17 may comprise: multiple input conduits 52 coupled to circumferentially spaced-apart locations of the compressor casing 50; an intermediate conduit 54 coupled to the input conduits 52; a main conduit 56 and a bypass conduit 58 coupled to the intermediate conduit 54; and upper and lower supply conduits 62, 64 coupled to the main and bypass conduits 56, 58.

The supply conduits 62, 64 extend through the turbine casing 38 so as to allow compressed air to enter the semi-cylindrical halves 40, 42 of the turbine casing 38, see FIG. 2. More specifically, the supply conduits 62, 64 extend through corresponding first and second bores (only the first bore 38C is shown in FIG. 3) in the turbine casing 38 and are coupled to a circumferentially extending impingement manifold 66, which manifold 66 also forms part of the fluid structure 16. In the illustrated embodiment, the manifold 66 is positioned within an annular cavity 66A defined between the turbine casing 38 and the second blade ring 28B.

The fluid structure 16 further comprises, in the illustrated embodiment, circumferentially extending first and second impingement pipes 68 and 70 coupled to the impingement manifold 66. In the illustrated embodiment, the first and second impingement pipes 68, 70 are axially spaced from one another and located in the annular cavity 66A defined between the turbine casing 38 and the second blade ring 28B.

The annular cavity 66A may not extend 360 degrees, i.e., it may be restricted at 0 and 180 degree positions so as to define separate upper and lower cavity sections. In such an embodiment, each impingement pipe 68, 70 may comprise upper and lower halves received in the upper and lower cavity sections. Further, the manifold 66 may comprise upper and lower separate halves received in the upper and lower cavity sections.

Each impingement pipe 68, 70 comprises a plurality of openings 68A, 70A. As illustrated in FIG. 3, the impingement pipe openings 68A, 70A may be located adjacent to facing outer vertical surfaces 128E and 128F of an upstream end 28E and the downstream end 28F of the second blade ring 28B. The facing outer vertical surfaces 128E and 128F define portions of an overall outer surface 78 of the second blade ring 28B. As shown by the flow arrows in FIG. 3, the impingement pipe opening orientation allows discharge of compressed air in a direction away from a plurality of circumferentially spaced apart openings 76 in the blade ring 28 and toward the facing outer vertical surfaces 128E and 128F of the upstream and downstream ends 28E and 28F of the second blade ring 28B. The circumferentially spaced-apart openings 68A may have different sizes such that the mass flow rate/opening 68A is constant, i.e., the air discharged by the pipe 68 is metered uniformly circumferentially. Likewise, the sizes of the circumferentially spaced-apart openings 70A may vary such that the mass flow rate/opening 70A is the same.

In the illustrated embodiment, the compressed air is discharged directly against the facing surfaces 128E and 128F and travels along those surfaces 128E and 128F so as to increase the heat transfer coefficient between the compressed air and the blade ring outer surface 78. The compressed air then flows into the openings 76 in the stationary blade ring 28B, which are generally located at a central axial location of the blade ring 28B in the illustrated embodiment. After flowing through the openings 76 and the impingement plate 36, the compressed air flows into cooling passages 80A provided in each vane 20 of the second row 20B of vanes 20. The cooling passage 80A extends from the vane platform 32B facing the blade ring 28B, into the vane 20 in a radial direction. The cooling passages 80A terminate at a radially-spaced row of discharge bores 80B extending to a trailing edge of the vane 20, see FIG. 3.

Each impingement pipe 68, 70 may be insulated in order to reduce undesired heating or cooling of the compressed air before impingement onto the blade ring 28B.

The main conduit 56 may include a first electronically controlled proportional valve 60 (shown only in FIG. 1) to control the flow rate of compressed air flowing through the main conduit 56, see FIG. 1. The bypass conduit 58 may be coupled to a heat exchanger 59 (shown only in FIG. 1) for removing energy in the form of heat from, i.e., to cool, compressed air flowing through the bypass conduit 58. Further, the bypass conduit 58 may contain a second electronically controlled proportional valve 61 (shown only in FIG. 1) to control the flow rate of cooled compressed air flowing through the bypass conduit 58. The two valves 60 and 61 may be controlled so as to provide compressed air to the annular cavity 66A defined between the turbine casing 38 and the second blade ring 28B at a desired flow rate and temperature. During engine start-up, no cooled air is provided to the annular cavity 66A as it is desired to maintain the compressed air at an elevated temperature such that it functions to heat the second blade ring 28B. Hence, in the illustrated embodiment, the valve 61 is closed during engine startup and loading. However, once the engine has been sitting at any load and thermal conditions in the engine have reached a steady-state condition, it may be desirable to provide cooled compressed air to the annular cavity 66A by opening valve 61 to effect cooling of the second blade ring 28B so as to tighten blade tip clearances.

Figure 4:
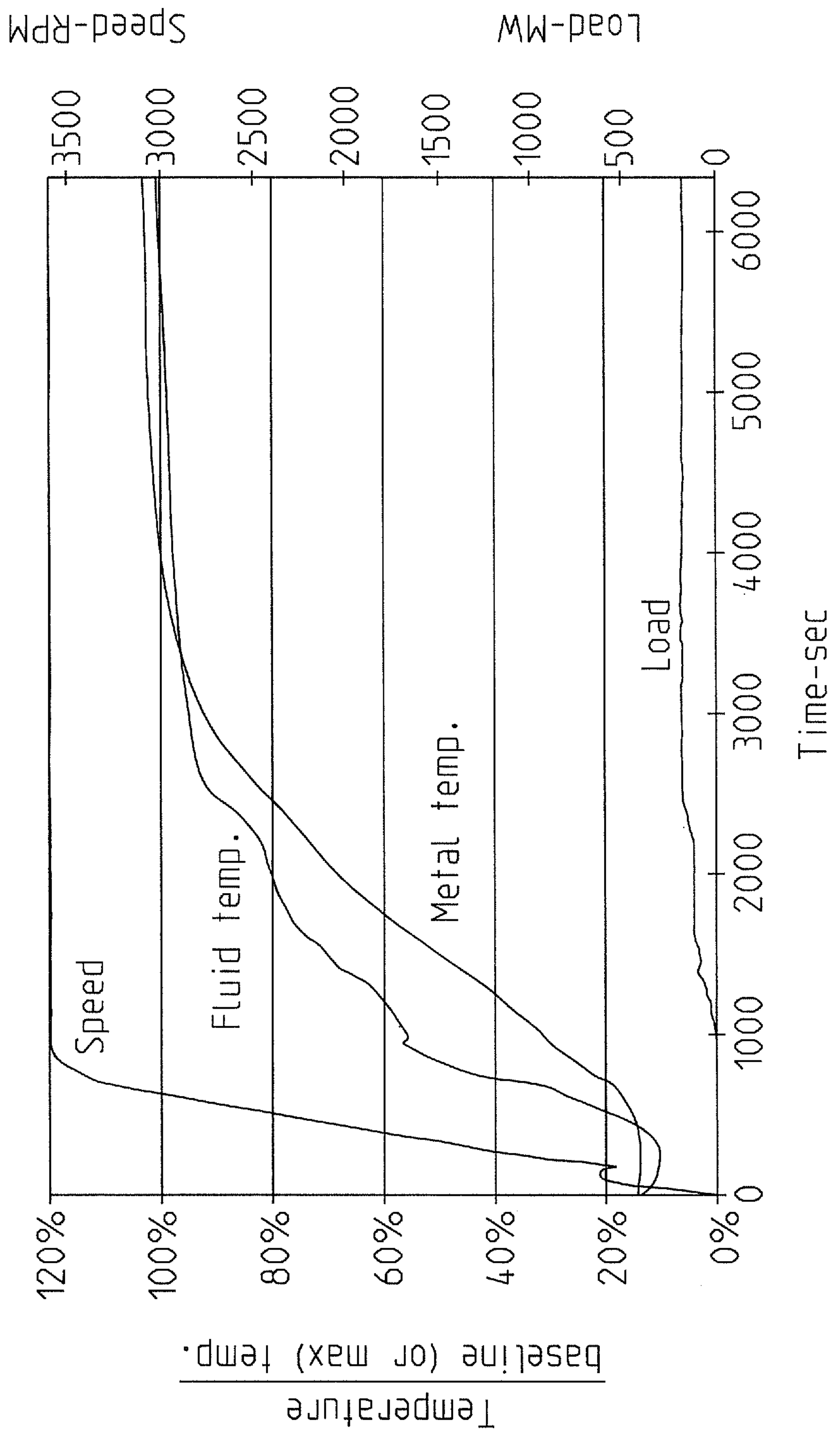
FIG. 4 illustrates the difference in temperature between the fluid structure and the metal turbine components relative to time according to the prior art.

The fluid structure 16 of the present invention preferably increases the heat transfer coefficient between the compressed air and the blade ring 28B in order to avoid the thermal expansion lag of the blade ring 28B during engine start-up, as found in the prior art. FIG. 4 illustrates the prior art relationship between a blade ring current temperature/maximum blade ring temperature during startup, loading and steady-state operation (Metal temp.) and a compressed air current temperature/maximum compressed air temperature during startup, loading and steady-state operation (Fluid temp.) without the fluid impingement structure or process of the present invention. While the compressed air Fluid temp. elevates quickly at gas engine startup, the compressed air of the prior art does not quickly increase the blade ring Metal temp. As FIG. 4 shows, the blade ring Metal temp. is about 30% after 1000 seconds and about 70% after 2000 seconds. Such a thermal expansion lag of the blade ring 28 may result in the cold-build gap between the second row 22B of blades and the ring segment 30B being larger than desired so as to avoid interference between the tips of the second row 22B of blades 22 and the ring segment 30B supported by the blade ring 28B at the pinch point.

Figure 5:
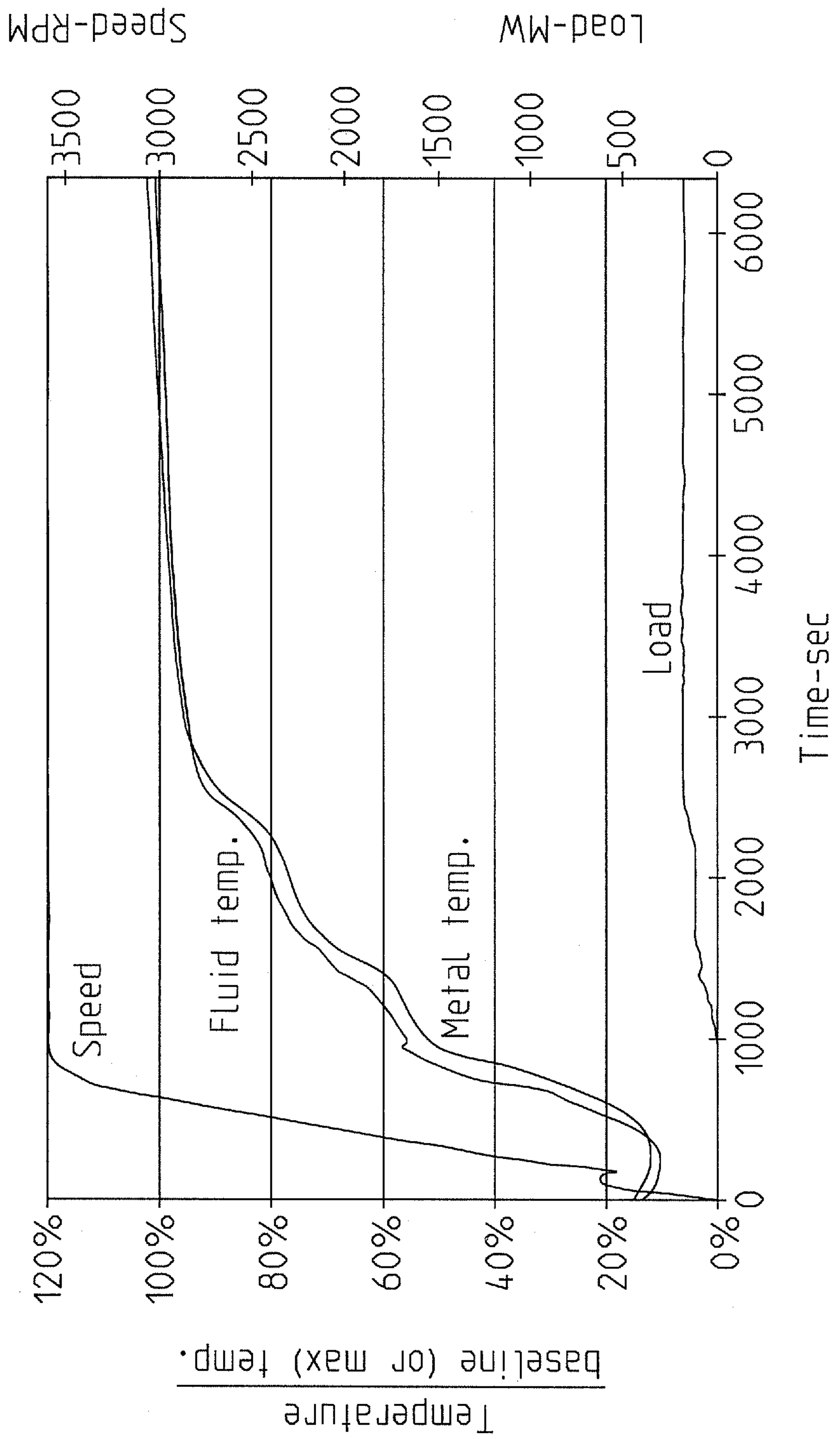
FIG. 5 illustrates the difference in temperature between the fluid structure and the metal turbine components relative to time according to another aspect of the present invention.

In contrast, FIG. 5 shows the relationship between the blade ring current temperature/maximum blade ring temperature (Metal temp.) during startup, loading and steady-state operation and the compressed air current temperature/maximum compressed air temperature (Fluid temp.) during startup, loading and steady-state operation with the fluid impingement structure and process of the present invention. A faster increase in Metal temp. of the blade ring is displayed as a result of the fluid structure and process of the present invention. The blade ring Metal temp. in FIG. 5 is about 50% after 1000 seconds (compared to 30% as found in the prior art chart of FIG. 4) and about 78% after 2000 seconds (compared to 70% as found in the prior art chart of FIG. 4).

Referring again to FIG. 5, the compressed air Fluid temp. of the present invention quickly increases to an elevated temperature after the gas turbine engine begins operation. As a result of the fluid structure 16 illustrated in FIG. 3, the compressed air transfers energy in the form of heat to the stationary blade ring 28B during ramp up of the gas turbine engine, see "Metal temp." in FIG. 5. This energy transfer causes the stationary blade ring 28B to move radially away from the corresponding second row 22B of blades 22. The casing channel 48 and blade ring flange 46 accommodates expansion of the blade ring 28B by providing a clearance C between an outer tip of the blade ring flange 46 and an inner surface of the casing channel 48, as described above and shown in FIGS. 1 and 3. The energy transfer in the form of heat from the compressed air to the blade ring 28B allows the blade ring 28B to quickly expand to match the faster radial expansion of the turbine blades 22 caused by a rapid increase in the temperature of the hot working gases impinging and centrifugal forces acting on the blades 22. As shown in FIG. 5, the blade ring temperature (Metal temp.) closely follows the compressed air temperature (Fluid temp.) as the gas turbine engine begins operation and continues until the point of about 100% load at about 2500 seconds. This close temperature relationship allows for a smaller cold-build gap between the second row 22B of blades 22 and the ring segment 30B and prevents interference between tips of the second row 22B of blades 22 and the corresponding ring segment 30B supported by the blade ring 28B at a pinch point. In the illustrated embodiment, the pinch point is characterized by the thermal expansion lag of the blade ring 28B relative to the expansion of the rotating blades 22 and may occur during loading at engine startup.

At about 2500 seconds, the gas turbine engine reaches 100% load and begins steady-state operation at about 3000 seconds, see FIG. 5. Once the gas turbine engine has been sitting at any load and thermal conditions in the engine have reached a steady-state condition, valve 61 may be opened so as to allow cooled compressed air to flow to the annular passage 66A and, hence, function to cool the stationary blade ring 28. The compressed air may be discharged continuously through the fluid structure 16 of the present invention and onto the blade ring 28 during substantially the entire operation of the gas turbine engine. This allows for the dual purpose of increasing heat transfer from the compressed air to the blade ring 28 during engine start-up (0% to about 100% load) and cooling the blade ring 28 with cooled air during steady-state operation.

It is further contemplated that the fluid structure 16 may also comprise third and fourth impingement pipes similar to the first and second impingement pipes 68 and 70, which may be positioned within an annular cavity defined between the turbine casing and the third blade ring 28C so as to increase the heat transfer coefficient between the compressed air and the third blade ring 28C during engine start-up. It is still further contemplated that the fluid structure 16 may additionally comprise fifth and sixth impingement pipes similar to the first and second impingement pipes 68 and 70, which may be positioned within an annular cavity defined between the turbine casing and the fourth blade ring 28D so as to increase the heat transfer coefficient between the compressed air and the fourth blade ring 28D during engine start-up.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising:

a compressor for generating compressed air, wherein the compressed air increases in temperature from ambient when the gas turbine engine begins operation to an elevated temperature;

a turbine comprising:

a plurality of rows of vanes;

a plurality of rows of rotatable blades;

at least one static structure comprising a blade ring surrounding a corresponding row of vanes and a corresponding row of blades;

said blade ring including upstream and downstream ends defining respective vertical blade ring surfaces, said vertical blade ring surfaces extending radially outward to an engagement of said blade ring with an inner surface of a turbine casing surrounding said blade ring; and fluid structure for receiving compressed air from the compressor and extending toward said one stationary blade ring for discharging the compressed air directly against at least one of said vertical blade ring surfaces of said blade ring at least during an initial startup period of said gas turbine engine such that the compressed air impinges on said at least one vertical blade ring surface, said fluid structure comprising at least one impingement pipe located adjacent said at least one vertical blade ring surface and including a plurality of openings positioned so as to discharge the compressed air toward said at least one vertical blade ring surface.

2. The gas turbine engine as set forth in claim 1, wherein the compressed air transfers energy in the form of heat to the blade ring during ramp-up of the gas turbine engine from about 0% load to about 100% load, thereby causing the stationary blade ring to move radially away from said corresponding row of blades.

3. The gas turbine engine as set out in claim 1, wherein said at least one impingement pipe extends circumferentially.

4. The gas turbine engine as set out in claim 1, wherein said at least one static structure further comprises a ring segment coupled to said blade ring and positioned between said blade ring and said corresponding row of blades.

5. The gas turbine engine as set out in claim 1, wherein said vanes of said corresponding row of vanes comprise cooling passages which communicate with at least one corresponding opening in said one blade ring such that the compressed air passes through said vane passages after impinging upon said at least one vertical blade ring surface.

6. The gas turbine engine as set out in claim 1, wherein said turbine comprises a plurality of static structures comprising blade rings, each of said static structures surrounding a corresponding row of vanes and a corresponding row of blades.

7. The gas turbine engine as set out in claim 1, wherein said at least one impingement pipe is located entirely between said vertical blade ring surfaces.

8. A gas turbine engine comprising:

a compressor for generating compressed air;

a turbine comprising:

a plurality of rows of vanes;

a plurality of rows of rotatable blades;

at least one static structure comprising a blade ring surrounding a corresponding row of vanes and a corresponding row of blades, each of said vanes of said corresponding row of vanes comprising a cooling passage, and said blade ring including at least one opening for communicating with said cooling passages of said corresponding row of vanes;

said blade ring including upstream and downstream ends defining respective vertical blade ring surfaces, said vertical blade ring surfaces extending radially outward to an engagement of said blade ring with an inner surface of a turbine casing surrounding said blade ring; and fluid structure for receiving compressed air from the compressor and extending toward said stationary blade ring for discharging the compressed air directly against at least one of said vertical blade ring surfaces of said blade ring such that the compressed air impinges on said at least one vertical blade ring surface and then passes through said at least one opening in said stationary blade ring and into said cooling passages of said corresponding row of vanes, said fluid structure comprising at least one impingement pipe located adjacent said at least one vertical blade ring surface and including a plurality of openings positioned so as to direct the compressed air toward said at least one vertical blade ring surface.

9. The gas turbine engine as set forth in claim 8, wherein the compressed air transfers energy in the form of heat to the stationary blade ring during ramp up of the gas turbine engine, thereby causing the stationary blade ring to move radially away from said corresponding row of blades, and the compressed air further functions to cool said stationary blade ring during steady state operation of the gas turbine engine.

10. The gas turbine engine as set out in claim 8, wherein said at least one impingement pipe extends circumferentially.

11. The gas turbine engine as set out in claim 8, wherein said at least one static structure further comprises a ring segment coupled to said blade ring and positioned between said blade ring and said corresponding row of blades.

12. The gas turbine engine as set out in claim 8, wherein said turbine comprises a plurality of static structures comprising blade rings, each said static structure surrounding a corresponding row of vanes and a corresponding row of blades.

13. The gas turbine engine as set out in claim 8, wherein said fluid structure discharges the compressed air in a direction away from said at least one opening in said blade ring.

14. The gas turbine engine as set out in claim 10, wherein said at least one impingement pipe is located entirely between said vertical blade ring surfaces.

15. The gas turbine engine as set out in claim 14, including first and second impingement pipes having impingement openings directing compressed air to impinge only on said vertical blade ring surfaces at said upstream and downstream ends of the blade ring.

16. The gas turbine engine as set out in claim 8, wherein said row of vanes includes platforms, and including an isolation structure coupling said platforms to the said blade ring.

17. A process for operating a gas turbine engine wherein the gas turbine engine comprises:

a compressor for generating compressed air, wherein the compressed air increases in temperature from ambient when the gas turbine engine begins operation to an elevated temperature;

a turbine comprising:

a plurality of rows of vanes;

a plurality of rows of rotatable blades;

at least one static structure comprising a blade ring surrounding a corresponding row of vanes and a corresponding row of blades;

said blade ring including upstream and downstream ends defining respective vertical blade ring surfaces, said vertical blade ring surfaces extending radially outward to an engagement of said blade ring with an inner surface of a turbine casing surrounding said blade ring; and fluid structure for receiving compressed air from the compressor and extending toward said one stationary blade ring for discharging the compressed air directly against at least one of said vertical blade ring surfaces of said blade ring at least during an initial startup period of said gas turbine engine such that the compressed air impinges on said at least on vertical blade ring surface, said fluid structure comprising at least one impingement pipe located adjacent said at least one vertical blade ring surface and including a plurality of openings positioned so as to discharge the compressed air toward said at least one vertical blade ring surface; the process comprising:

discharging compressed air directly against the vertical blade ring surface of said blade ring at least during the initial startup period of the gas turbine engine such that the compressed air impinges on said vertical blade ring surface so as to increase the temperature of said vertical blade ring surface.

18. The process as set out in claim 17, wherein said discharging comprises discharging the compressed air continuously during substantially the entire operation of the gas turbine engine.

* * * * *